(12) United States Patent
Chang et al.

(10) Patent No.: US 9,942,399 B2
(45) Date of Patent: *Apr. 10, 2018

(54) SYSTEM AND METHODS FOR TRACKING UNRESOLVED CUSTOMER INVOLVEMENT WITH A SERVICE ORGANIZATION AND AUTOMATICALLY FORMULATING A DYNAMIC SERVICE SOLUTION

(71) Applicant: Genesys Telecommunications Laboratories, Inc., Daly City, CA (US)

(72) Inventors: Yi Chang, Saratoga, CA (US); Robert Andrew Finan, Stockerau (AT); Richard McCrossan, Lisburn (GB); Brian Bischoff, Raleigh, NC (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/447,598

(22) Filed: Jul. 30, 2014

(65) Prior Publication Data
US 2014/0341369 A1 Nov. 20, 2014

Related U.S. Application Data

(63) Continuation of application No. 12/342,368, filed on Dec. 23, 2008, now Pat. No. 8,831,203.

(51) Int. Cl.
*H04M 7/00* (2006.01)
*H04M 3/51* (2006.01)

(52) U.S. Cl.
CPC ............................ *H04M 3/5175* (2013.01)

(58) Field of Classification Search
USPC .................... 379/221.04, 203.01, 201.01
See application file for complete search history.

(56) References Cited

U.S. PATENT DOCUMENTS

| | | | |
|---|---|---|---|
| 6,400,804 B1 * | 6/2002 | Bilder | H04M 3/428 379/114.13 |
| 6,826,194 B1 | 11/2004 | Vered et al. | |
| 6,870,924 B1 * | 3/2005 | Ukon | H04M 3/42042 379/265.02 |
| 7,209,444 B2 | 4/2007 | Foster et al. | |

(Continued)

*Primary Examiner* — Quynh Nguyen
(74) *Attorney, Agent, or Firm* — Lewis Roca Rothgerber Christie LLP

(57) ABSTRACT

A system for managing customer involvement with a contact center involves one or more monitoring applications executing on one or more computerized servers associated with the contact center, the applications monitoring communications between individual customers and the center; and a rules engine executing on the one or more computerized servers, the rules engine accessible to the monitoring application, the rules engine enabled to generate and implement business rules. Upon detection by one of the monitoring applications of an instance of unsuccessful or incomplete interaction between a customer and the contact center, session data determined during monitoring is used by the rules engine to determine contact center-initiated activity to be implemented to establish new communication with the customer to resolve issues related to the unsuccessful or incomplete interaction.

21 Claims, 5 Drawing Sheets

(56) References Cited

U.S. PATENT DOCUMENTS

| | | |
|---|---|---|
| 8,600,019 B1 | 12/2013 | Cooper et al. |
| 8,831,203 B2 | 9/2014 | Chang et al. |
| 2008/0002823 A1* | 1/2008 | Fama et al. ............... 379/265.12 |
| 2008/0043978 A1* | 2/2008 | Lai et al. .................. 379/221.04 |
| 2008/0075238 A1* | 3/2008 | Winslow ............... H04M 3/493 |
| | | 379/88.01 |
| 2010/0002865 A1 | 1/2010 | Kennedy et al. |
| 2011/0026692 A1* | 2/2011 | Sharp .................... H04W 68/08 |
| | | 379/88.23 |

\* cited by examiner

SYSTEM AND METHODS FOR TRACKING UNRESOLVED CUSTOMER INVOLVEMENT WITH A SERVICE ORGANIZATION AND AUTOMATICALLY FORMULATING A DYNAMIC SERVICE SOLUTION

CROSS-REFERENCE TO RELATED APPLICATIONS

This application is a continuation of U.S. patent application Ser. No. 12/342,368, filed on Dec. 23, 2008, the disclosure of which is hereby incorporated by reference in its entirety.

BACKGROUND OF THE INVENTION

1. Field of the Invention

The present invention is in the field of electronic services including telephony and Web-based services, and pertains particularly to methods for rules-based servicing of customers based on a combination of history, current status, and dynamic Web analytics.

2. Discussion of the State of the Art

In the field of electronic services, service organizations are continually developing new and better ways of servicing customers. State-of-art contact centers represent a vanguard of service for medium and larger service organizations, including financial institutions, product retailers, insurance service organizations, consumer service organizations, and so on.

A contact center or a federation of contact centers may be organized to handle new business, customer service, technical support, outbound sales, customer relations management (CRM), and customer billing and account management services. All of these may be performed by one center or several centers may be organized to provide these services.

State-of-art contact centers typically include interactive voice response (IVR) services for customers to engage in self-help. Telephone contact services are provided for live assistance. Electronic messaging services are provided such as email, short message service (SMS), multimedia message service (MMS), instant message service (MS), and chat services. Web services are also typically provided and are integrated to some degree with the other mentioned services.

Live assistance generally involves contact center agents who are typically connected to a local area network (LAN) via personal computer (PC) with a graphics user interface (GUI) and in some cases an Internet protocol (IP) telephone. PBX systems, email routing systems, CTI sewers, telephony switching facilities, chat servers, conference bridges, and other service nodes and systems are usually part of such apparatus.

Contact centers maintain customer information and contact center information in one or more databases such as a customer relations management (CRM) database, billing database, product information database, etc. Live agents and automated attendants (voice applications/Web-based services) may access data typically by performing database lookups to obtain the required data for any interaction. In a contact center system known to the inventor information about a customer is typically available to automated systems at the time of interaction and may be made available to live agents ahead of routing. Maintaining interaction history, analyzing interaction behavior, and statistical data mining are typical in state-of-art centers.

A problem with customer servicing arises whenever some process, state, or result fails to satisfy the goal of the customer. Contact center application developers are constantly tweaking and refining applications and processes to better service the customer. One challenge that persists in many contact center environments is the challenge of organizing services and data management in a way that reduces redundancy of data aggregation and repetition of processes within the center.

Current best practices in contact center data aggregation and management still do not consider data entry into the system as a result of customer interaction. That is to say that often customers must re-enter data several times during routine business with the service organization. One reason for this is a lack of orchestration between data centers managed within the contact center environment. Different departments may each have separate records and histories of a customer, such as automated service records and receipts versus customer demographic data versus customer complaint history and so on.

Centralized data stores may be provided wherein all of the center data is stored in one location. The difficulty with this approach alone is that many contact center environments are federated and data stores are regionally separated from one another. Another problem is difficulty managing all of the different types of data in one robust system. Still another problem is the absence of system intelligence for interpreting data with relevance to providing unique customer solutions more efficiently.

It has occurred to the inventor that if each point of possible customer access to the contact center shared a common platform that included access to all of the center business rules and all of the center data, then more efficient and intelligent interaction with a customer might result. Therefore, what is clearly needed is a system and methods for tracking unresolved customer interaction with a service organization and automatically formulating a dynamic service solution that takes into account the original goal of the customer.

SUMMARY OF THE INVENTION

A significant problem stated above is that customer retention and revenue retention is desirable in a contact center system, but many of the conventional means for relating to customers and generating revenue do not account for potential customers who have had past involvement with the contact center, but who have not experienced satisfaction related to the goal of the involvement.

The inventors therefore considered functional elements of a contact center system, looking for elements that could potentially be harnessed to provide customer retention and revenue generation, but in a manner that would not create undue strain on center resources.

Every contact center is driven by customer interaction, one by-product of which is an abundance of data recorded that forms the interaction history of the center. Most such contact centers employ automated self-help services as well as live assistance services to handle events received by the system. Interactive voice response systems, message routing systems, and live-agent queue systems are typically a part of such apparatus.

The present inventors realized in an inventive moment that if failed or incomplete customer involvement with the center could be logged and associated data and intent of the customer could be preserved for later proactive or reactive contact initiated by the center, a significant increase in generated revenue and customer satisfaction might result. The inventor therefore developed a unique interaction monitoring and customer contact management system that allowed past unresolved contacts between potential customers and a contact center to be exploited for customer retention and revenue generation. A significant improvement in revenue generation and customer retention results with no appreciable pressure on existing contact center resources.

Accordingly, in one embodiment of the invention a system for managing customer involvement with a contact center is provided, comprising one or more monitoring applications executing on one or more computerized servers associated with the contact center, the applications monitoring communications between individual customers and the center, and a rules engine executing on the one or more computerized servers, the rules engine accessible to the monitoring application, the rules engine enabled to generate and implement business rules. Upon detection by one of the monitoring applications of an instance of unsuccessful or incomplete interaction between a customer and the contact center, session data determined during monitoring is used by the rules engine to determine contact center-initiated activity to be implemented to establish new communication with the customer to resolve issues related to the unsuccessful or incomplete interaction.

In another aspect of the invention a method for managing customer involvement with a contact center is provided, comprising steps of (a) executing one or more monitoring applications on one or more computerized servers associated with the contact center, the applications monitoring communications between individual customers and the center; (b) detecting by one of the monitoring applications of an instance of unsuccessful or incomplete interaction between a customer and the contact center; and (c) using data related to the instance of unsuccessful or incomplete interaction between a customer and the contact center by a rules engine executing on the one or more computerized servers to determine contact center-initiated activity to be implemented to establish new communication with the customer to resolve issues related to the unsuccessful or incomplete interaction.

BRIEF DESCRIPTION OF THE DRAWING FIGURES

DETAILED DESCRIPTION

The inventors provide a unique rules-based system adapted to retain and resume potential customer sessions with a contact center after detecting one or more unresolved communications sessions, failed transactions or communication attempts. The system and methods of the invention are described in enabling detail in various embodiments described in the detailed description that follows.

Figure 1:
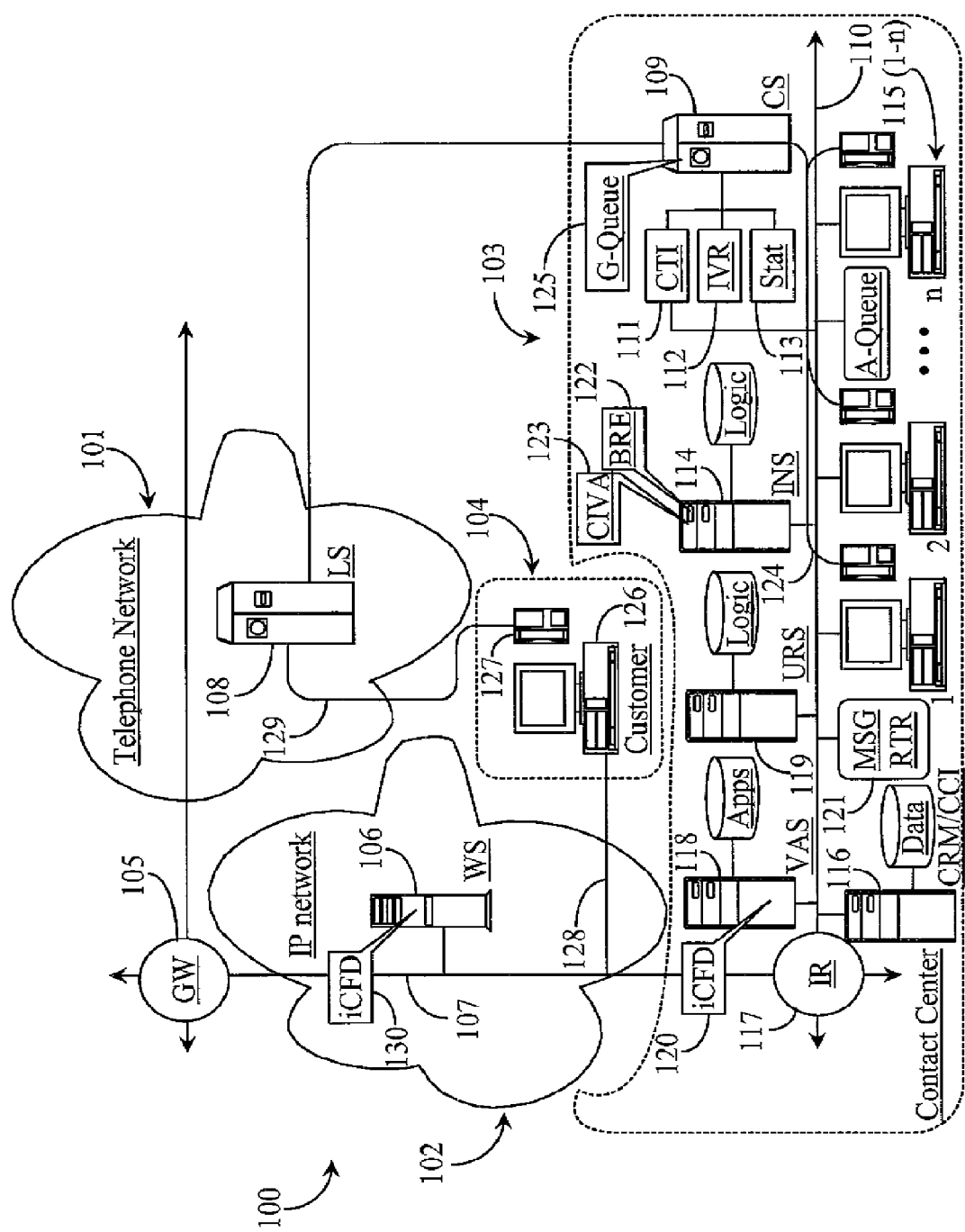
FIG. 1 is an architectural overview of a communications network supporting intelligent customer retention according to an embodiment of the present invention.

FIG. 1 is an architectural overview of a communication network 100 supporting intelligent customer retention according to an embodiment of the present invention. Communications network 100 is logically illustrated in this example and includes a telephone network 101, a wide-area-network (WAN) 102, and a contact center (CC) 103 having communications access and connectivity to the described networks.

WAN 102 is an Internet protocol (IP) network that may be a private, corporate, or public network adapted for transfer control protocol over Internet protocol (TCP/IP). In this example, network 102 is the well-known Internet network and is further exemplified by an Internet backbone 107. Backbone 107 logically represents all of the lines, equipment, and access points that make up the Internet network as a whole including any connected sub-networks. Therefore, there are no geographic limitations in the practice of the present invention. The inventor chooses to represent the Internet in this example as a supporting network because of the many universal standards and protocols and because of its high public access characteristic. The invention may, however be practiced on other more restricted IP networks without departing from the spirit and scope of the present invention.

Telephone network 101 may be a private or public telephone carrier network such as the public switched telephone network (PSTN). Telephone network 101 is further exemplified logically be a telephone network backbone that represents all of the lines, equipment, and access points that make up a telephone network such as the PSTN. A gateway (GW) 105 logically connects telephone network 101 to Internet network 102 providing seamless integration between the two networks for cross communication.

CC 103 has telephone access and connection to telephone network 101 by way of a computer-telephony-integrated (CTI) central office switch (CS) 109, a telephone service line connected to a local telephone switch (LS) 108 in network 101. LS 108 and CS 109 may be automated call distributors (ACD) or private branch exchange (PBX) switches or some other known type of telephone switching facility without departing from the spirit and scope of the present invention including soft switching facilities.

CC 103 has an internal local area network (LAN) 110 provided therein and adapted for TCP/IP and having Internet access through an Internet router (IR) 117. LAN 110 supports a variety of state-of-art equipment such as a CTI server 111, an interactive voice response (IVR) unit 112 and a statistics (Stat) server 113. CTI server 111 provides agent level routing (ALR) intelligence to CS 109. Calls incoming from the outside of CC 103 are temporarily queued at switch 109 in a general queue (G-Queue) 125.

LAN 110 within CC 103 supports several agent-operated communications stations 115 (1-n). In this example an agent station 115-1, an agent station 115-2, and an agent station 115-n are illustrated. Each agent station 115 (1-n) includes a LAN-connected personal computer (PC) and a telephone. In this example, the telephones are wired directly to CS 109 for communications purposes using internal telephone wiring 124. In one embodiment the telephones may be IP telephones connected to the LAN. Agent PCs are quipped with a graphics user interface for visualizing CC business and activities.

A voice application server (VAS) 118 is provided and has a digital storage medium associated thereto (Apps) for storing voice applications for IVR and Web-service presentation. A universal routing server (URS) 119 is provided within center 103 and is connected to LAN 110. URS 119 has a digital storage medium (logic) provided thereon or associated therewith adapted for storing routing stratagems that include executable routing strategies and constructs for building routing strategies.

An interaction server (INS) 114 is provided within CC 103 and is connected to LAN 110. INS 114 is adapted to direct and monitor CC interactions represented therein as, in one embodiment, open media interactions. All contact center interactions may be virtually represented in real time in interaction server 114. INS 114 has a digital medium (Logic) provided thereon or otherwise accessible thereto that contains business rules and constructs for building executable business rules used by the center to direct workflow and communications.

CC 103 includes a customer relations management/contact center information (CRM/CCI) server 116 having a digital medium (Data) provided thereon or otherwise accessible thereto adapted to store customer data and contact center information. Customer data may include contact history, interaction history, purchase history, payment history, and customer attributes such as profile data contact data, value ranking data, and so on. CCI may include product data, frequently asked question (FAQ) data, sales campaign data, sales pricing information, product inventory data and the like. CRM and CCI systems may be hosted on separate servers within CC 103. The inventor combines the facilities in one server to save drawing space.

A message router (MSG/RTR) 121 is provided within CC 103 and is connected to LAN 110. MSG/RTR 121 is adapted to route incoming email messages and other electronic message communications to available agent stations. Router 121 may also facilitate outbound messaging campaigns. An agent queue (A-Queue) 131 is provided within CC 103 and represents any physical or virtual queue system for queuing incoming events for available agents. CC 103 represents a state-of-art center as known to the inventors and whose agents may handle virtually any form of electronic communication. CC 103 hosts a Web server (WS) 106 illustrated logically within Internet cloud 102 connected to backbone 107. WS 106 is adapted to serve Web pages to existing and potential customers in the form of one or more Web sites. WS 106 may also represent a Web services and telephony services contact point for customers trying to reach contact center services.

A potential customer station 104 is illustrated in this example and includes a customer-operated PC 126 and a customer operated telephone 127. Station 104 represents any customer and customer communications appliances that may be involved in contacting and interacting with CC 103. PC 126 may be a notebook or laptop computing device, a personal digital assistant (PDA) or a cellular telephone or smart phone having Internet capability. Telephone 127 is representative of any device capable of telephone interaction over the network. In this example, customer station 104 has telephone access to center 103 via telephone 127 telephone access line 129 and connected switch 108. Computing device 126 has access to WS 106 via Internet access line 128. One with skill in the art wilt appreciate the varied access technologies available for Internet connection including digital subscriber line (DSL) including broadband, integrated digital services network (ISDN), cable modem, and dialup connection using an Internet service provider (ISP).

VAS 118 has a voice application 120 servable therefrom to IVR 112 for interaction with callers. In one embodiment application 120 is termed by the inventors intelligent customer front door (iCFD). Application 120 may be a natural language voice application enabled by dynamic script generation in response to IVR input. When a caller such as a customer operating from station 104 connects to switch 109, the call may be queued in G-queue 125 until the IVR picks up the call and starts the iCFD application, which may be tailored to the particular type of business conducted.

In this example, INS 114 receives notification of the event and may launch a customer interaction verification application (CIVA) to identify and perhaps authenticate the caller. Customer identification may be accomplished through automated number identification (ANT) or other known identification services. CIVA 123 is adapted in one embodiment to monitor the interaction and may rely on business rule logic and a business rules engine (BRE) 122 provided to INS 114 and made executable thereon. CIVA 123 may also be adapted to detect interaction problems and to rediscover logged interaction problems based on some customer identification at a later time.

In one embodiment of the invention, during normal IVR interaction, CIVA 123 may detect a pattern of difficulty the caller may exhibit. Such a pattern detected may be a trigger for executing a business rule that may affect the normal routing strategy relevant to the interaction. For example, the system might determine that the caller is having some difficulty and may offer through the iCFD application in execution by IVR 112 to route the caller to an available live agent working at one of stations 115. The actual routing strategy may be executed by customer acceptance of the offer such as by saying "yes". The event may then be routed from G-queue 125 to A-queue 131 where an available agent can take the call.

In the above case CIVA 123 provides the "intelligence" (*i*) in the iCFD application 120 for detecting a problem defined in rule logic and triggering a pre-scripted offer to speak to a live agent. However, monitoring of IVR interaction and detection of pre-defined problem patterns may be performed at the CTI or IVR level along with Stat server 113. An interaction server such as server 114 is not specifically required to practice the present invention. The business rule engine and intelligent monitoring application represented herein by BRE 122 and CIVA 123 may be provided to any customer interfacing system without departing from the spirit and scope of the invention.

In one embodiment of the invention CIVA 123 is adapted to detect when a failed transaction or failed connect attempt occurs. For example, a call might be registered at switch 109 and be routed from G-queue 125 to A-queue 131 for live assistance only to discover that the estimated wait time in queue is 20 minutes. If the customer decides to hang up in queue, CIVA 123 may detect a failed connect attempt (connection to a live agent) and may schedule an outbound call for a live agent to follow-up with the potential customer at some latter time or date. CIVA 123 can detect if a potential customer disconnects from switch 109. In one embodiment the function of CIVA 123 may be extended to LS 108 through a CTI network provided between the telephone switch facilities.

iCFD application 120 may also be presented to WS 106 to be executed as a voice application through a company Web site. In this embodiment customer 104 may access the application through an Internet connection between computing device 126 and WS 106 using a VXML browser. A contact center VRML (system) browser may also be available for telephone access to the Web-based version of the application illustrated herein as iCFD 130. CIVA 123 and BRE 122 may also be adapted to monitor and route Web interactions. In this case interactions occurring at WS 106 are registered with INS 114 for session creation and monitoring.

Much like monitoring a voice interaction on the IVR system for difficulties, the system may detect Web-based difficulties defined in the logic feeding business rule engine 122. Web based difficulties may include difficulty with interactive forms or data entry interfaces including log-in interfaces. A failed transaction at a checkout interface on the company's commercial Web site might be detected. Perhaps a customer terminates a session in the middle of making a purchase. CNA 123 may monitor and detect such difficulties and may, through iCFD application 130, offer live assistance if the customer is still in session. Those that have terminated their connection to the server can be contacted via an outbound campaign provided some contact information is known to the system at the time the sessions were terminated.

In one embodiment of the present invention a customer operating PC 126 from station 104, for example, may send an email to any one of agents operating from agent stations 115. A message sent through IR 117 on to LAN 110 may be queued in a message router system 121 to be distributed to appropriate agent inboxes by routing strategy available to the router. CIVA 123 may detect that an email message is not being answered in a timely manner and checking CRM/CCI server 116, the applications determines the customer is a valuable customer that warrants a follow-up. CIVA 123 may also interpret content in the customer message and using BRE 122 may decide to send an automated system email message back to the customer explaining that the agent may not respond for some time (backlog) and the system may offer the customer options for receiving a call back from a live agent, connecting to a live agent by telephone (inbound), or perhaps entering a live chat session with an agent. The interactive options may be presented within and may be made executable from the message sent to the customer.

In one embodiment of the invention intelligence obtained during monitoring customer interactions includes detection of failed contact attempts, detection of terminated Web sessions, detection of telephone queue drop-outs, detection of difficulties with IVR interaction, Web form filling, and the like. The system may be integrated with a workforce management (WFM) system to ensure availability of outbound resources and the like for adding potential live interactions to their current workloads.

Figure 2:
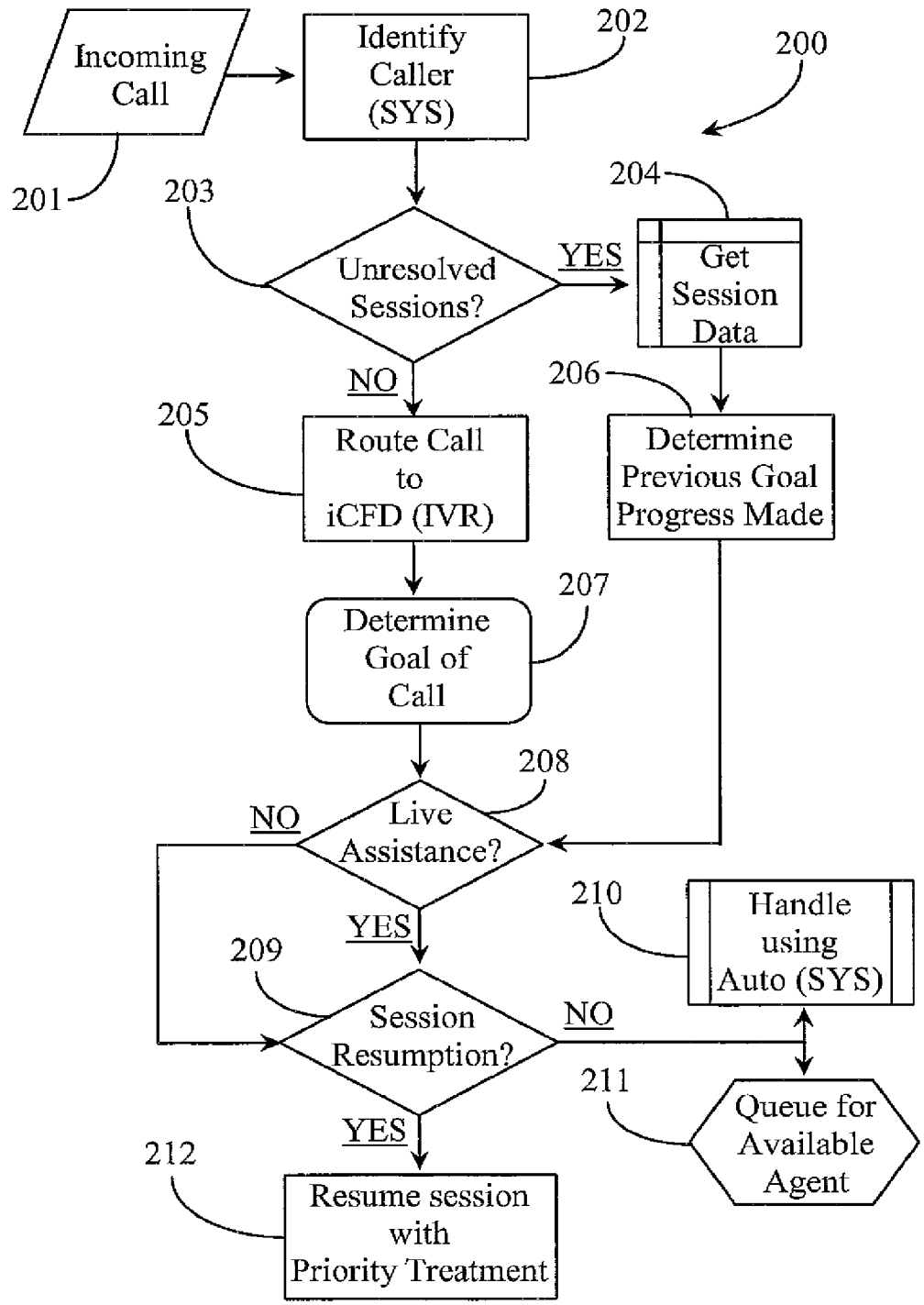
FIG. 2 is a process flow chart illustrating steps for resuming a fails or incomplete communication session according to an embodiment of the invention

FIG. 2 is a process flow chart illustrating steps 200 for resuming a failed or incomplete communication session according to an embodiment of the invention. At step 201 an incoming call is registered at the telephone switch within the call center, such as at switch 109 of FIG. 1. At this step the call may be placed in a general queue such as G-queue 125. At step 202 the identity of the caller is obtained through ANI or a like system. The event may be represented in an interaction server and may be routed eventually to an IVR running an iCFD application, which may begin interaction with the caller, picking the call up out of the general queue. In one embodiment all calls are routed to iCFD IVR treatment immediately without being queued at the switch.

In this example a customer verification application may be started, and using the customer telephone number retrieved through ANT may determine through database lookup, at step 203, if any unresolved sessions between the customer and the center occurred before the current telephone event. At step 203 the CIVA application performs a lookup in CC interaction history data to determine if there are any recent unresolved sessions between the caller and the CC. An unresolved session may be defined as any type of interaction in any media that went unanswered, or that did not satisfy the goal of the customer at the time. If at step 203 there are no "unresolved sessions", "open sessions" or "sessions in progress" (terms which might be used to identify such sessions), then at step 205 the event may be routed directly to iCFD (IVR) for normal treatment.

Correlation of contact information may be performed on a routine basis with all customers so that, for example, ANT verification may also point to an email address, an IM handle, or an IP address used by the customer. In this way the system may identify an unanswered email session or a terminated Web session from the telephone event verification process in addition to any calls that went unresolved. Content from such unresolved sessions may also be a part of the data record so that the system may quickly identify the appropriate session data and contact information related to any unresolved sessions that may have occurred before the current interaction.

The results of the lookup performed using ANI (number) as a key may determine which natural language prompts the caller will hear from the iCFD application at step 205. In the case that no earlier unresolved interactions occurred the first prompt the caller will hear are the typical IVR prompts to determine the purpose or goal of the current call. At step 207 in this case, the CFD application determines the goal of the caller before further treatment is conducted. Depending on IVR response from the customer, the system may determine at step 208 whether live assistance is required to satisfy the goal of the call.

At step 203, if the system detects that there are one or more unresolved sessions in progress or recorded in the center interaction history, then at step 204 the CIVA application may get the appropriate session data. At step 206 the system may from the retrieved data determine the previous goal of the customer that went unsatisfied. At step 208 the call may be routed to the iCFD (IVR) with the previous goal identified and the system may determine, based on the previous data, whether live assistance is required to help the customer satisfy that goal. In this case the caller may hear a very different prompt from what is normally served customers with no interaction history, or at least no unresolved interaction history with the center.

In either case the system (IVR running iCFD application) may first determine at step 208 whether live assistance is required relative to the customer goal before further routing or self-help prompting. If no live assistance is required to satisfy the goal of the customer, whether the goal is a current goal of a customer with no unresolved issues or whether the goal is a past unmet goal of a customer with one or more unresolved sessions, the process moves to step 209 where the system determines if a session resumption is in order for the customer. For a customer who dropped out of queue abruptly without leaving any call back instructions before a live agent could take the call, a session resumption may be an appropriate treatment.

If session resumption is decided at step 209 for a customer requiring live assistance where one or more unresolved sessions were discovered, routing strategy is ordered based on the executed rule created with the session information, including routing strategy used previously during the session that went unresolved. At step 212 the call may be routed in accordance with the previous goal of the caller with priority treatment. An example of this might be a caller dropped out of the agent queue because of a high estimated wait time (EWT) for the queue.

A customer that is experiencing a higher than normal EWT in queue may be prompted by the CFD (IVR) application, the prompt offering a menu of possible alternative treatments such as continue waiting in the queue, leaving a callback phone number, and time/date to be called back; leaving a callback phone number to be called back immediately when an agent reaches the customer's position in queue; leaving a SMS cell number to be contacted through SMS; leaving an email address to be contacted by email; or leaving an WI name to be contacted through Chat session. It is noted that preferred time and date parameters may also be specified by the customer for receiving the specified contact. However the customer may not accept any of the callback options.

The customer may have left the queue without leaving any information by simply hanging up. An hour later the customer may have called back and the previous interaction then was logged at the time of disconnect as an open or unresolved session. The call may be queued in the same place as before in the agents queue or moved to the front of the agent's queue depending on the data associated with the unresolved session and any independent ranking information available about the customer. If the EWT is still as high as or higher than the caller first experienced, the call may be moved to the front of the queue or may be routed to another agent with the same skill set but a lower EWT in queue.

At step 212 the resumed session might be characterized by routing the customer to the same place in the CFD IVR application that the caller was interacting with before dropping out of the system. In this case the caller may have been unable to complete an automated IVR process because of an interruption or the like. The system "saves" the customer's place in the application and retains all of the previous data entered by the customer in the uncompleted process. An additional prompt may be presented to the customer offering live assistance before resuming the uncompleted process with which the customer had previously interacted. The customer perhaps had a previous session that went unresolved but did not need live assistance to satisfy the customer's goal, so the session was resumed at the place the customer left the process.

For a customer who did not have any unresolved sessions at step 203 and who did not need live assistance at step 208 further needs no session resumption and therefore can be handled at step 210 using the normal automated system. If the customer did need live assistance at step 208 then the call can be queued for an available live agent at step 211 as part of the normal routing process. The goal of process 200 is to be able to quickly identify any customers that had failed connection attempts, failed transaction attempts, unanswered messages, incomplete Web-sessions or other problems due to communication or navigation problems. The identified customers are treated differently according to preexisting rules governing their possible circumstances and call center value ranking. In this way all of the callers may be treated by the system without segregation. Those that have unresolved sessions are culled from the call load for special treatment.

The system of the invention may help create new leads for outbound call campaigns where prequalification for the outbound contact is the original goal of the caller. The system may help to generate revenue that would otherwise be lost if past unresolved interactions were not part of searchable interaction history of potential customers. In one embodiment of the invention the iCFD application may be integrated with an up sell recommendation system and can integrate up sell offers into the natural language IVR CFD application or to an agent during a live assisted interaction. In the case of up selling, the original goal of the caller may be handled independently from the up sell offer or the up sell offer may be presented to change the goal of the customer from one product or service to the higher level version of the product or service.

In one embodiment at step 203 the unresolved session might be one that is in progress, like a current Web session, for example. In such a case live assistance may be ordered so that an agent may help the customer with the Web session issue by telephone. Logic for determining what types of interactive problems need to be logged and what problems or series of problems determines an unresolved session may vary according to the type of business and service goals of the call center. For example, a simple "disconnected from queue without leaving any information" may be considered a change of mind or perhaps a wrong number dialed whereas a second instance of queue disconnect might denote a pattern confirming that it is a potential customer with a service or product related goal in mind.

Figure 3:
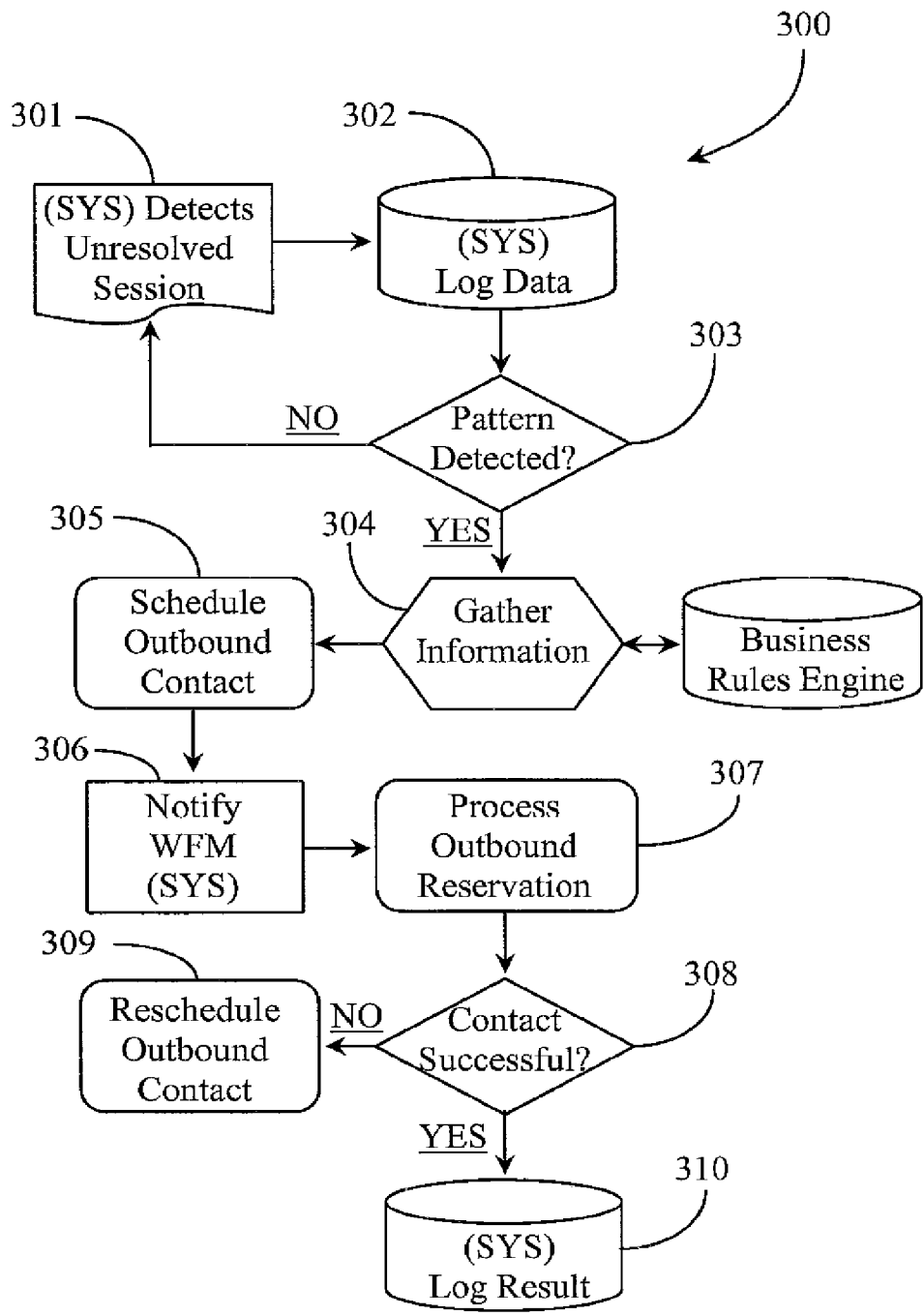
FIG. 3 is a process flow chart illustrating steps for initiating and executing an outbound contact resulting from detection of a failed communication pattern.

FIG. 3 is a process flow chart 300 illustrating steps for initiating and executing an outbound contact resulting from detection of one or more unresolved sessions. During monitoring of any interaction activity a monitoring application governed by rules may detect a failed or incomplete session, otherwise termed an unresolved session at step 301. An unresolved session is one in which the goal of the customer was not satisfied. This could be a failed transaction attempt or a telephone event that drops out of queue. An unresolved session may be a Web session that is terminated during a checkout process or an email message that has gone unanswered or undelivered for too long of a period.

As session monitoring continues at step 301 the system logs data relevant to unresolved sessions. In a computer-telephony integration (CTI) environment where an interaction server is used to represent session activity, the recorded interaction history might include that of telephone interaction, Web-based interaction, messaging interaction, and so on in one unified or abstracted interaction history log. Such a log might include a field for the type of interaction, a field for customer identification (contact data), and a field denoting the nature of the problem defined by rules. A telephony queue disconnect could be recorded where the type of interaction=telephone, the customer ID=123-123-4567, and the nature of the problem=queue-disconnect. Data associated with this event might include the queue ID, agent ID working the queue, EWT of the queue at the time of disconnect, and time of day and date of disconnect. Other data may be associated with the event by inference such as the skill level of the agent, the purpose of the queue (customer service, product or service sales, technical support, etc.), customer goal (solicited by IVR before queuing) and so on.

At step 303 the system may decide if a pattern has developed in the logged data such as more than one log entry for a potential customer that can be tied together by some commonality such as customer ID. In a simple pattern a customer can be identified by telephone number in two or more unresolved telephone call attempts. The commonality is the same ID number in the ID field of the data log. However, it may not be as simple to tie a remote Web session and a telephone call to a same customer.

A correlation process could be running in the background to verify that more than one log entry might belong to a same customer. For example, if a customer fails completing a Web-based process where the customer is identified by IP address, and then drops out of a queue later where the customer is identified by a telephone number, the correlation application can search CRM records to see if the identification parameters of the different log entries can be attributed to one customer. Therefore a pattern can be identified as a series of unresolved sessions or a series of mistakes or failed process steps in one current session.

It is not absolutely required that the system detect a pattern in the logged data before some action is contemplated, however a pattern of two or more events may help to establish customer motive and goal. If no pattern is detected then the process continues to monitor and log unresolved session data at steps 301 and 302. In this process it is not necessary to log session data of session where the goal of the customer is satisfied. Normal interaction history may be recorded separately from interaction history that falls under the definition unresolved.

If a pattern is required in unresolved session data before some action is taken and a pattern is detected at step 303 then the system gathers the relevant information related to the unresolved session data at step 304 for use in rules generation among other tasks that might be generated.

If the information gathered at step 304 is determined to invoke some action after consultation with one or more business rules, then at step 305 an outbound contact may be scheduled with an outbound system with a generic purpose such as a call-back routing or with a dedicated purpose such as with an ongoing outbound campaign, depending on the customer goal determined in the information gathered. In one embodiment periodic searches may be conducted of the unresolved session data to determine if there is developing conditions for initiating outbound contact. In another embodiment the search is performed each time a new interaction is received at the contact center. In one embodiment the search is conducted at each incoming interaction and on a periodic basis independently of any new interaction.

At step 306 a WFM system might be consulted or notified to ensure resource availability for the proposed outbound contact of step 305. The type of outbound contact scheduled will depend in part of the information gathered and the information relevant to the one or more unresolved sessions. For example, if the unresolved session is a queue disconnect from an agent queue and the customer ID is a telephone number and no other unresolved sessions were detected, then the system will schedule an outbound telephone call to the customer number. The exact nature of the outbound call will also depend on gathered information. If the gathered information indicates a pattern of telephone contact and the telephone number of the customer is known then it is likely that telephone outbound contact would be initiated. However, the system may make a decision to contact the customer by another way if the appropriate contact information is known to the system, such as adding the customer to an outbound email campaign or scheduling an agent to contact the customer via email or IM if the handle is known.

At step 307 the outbound reservation is made or processed. The customer may be added to an existing campaign or the event could be assigned to an individual agent as part of the agent's normal workload. At step 308 at the scheduled time the outbound contact is made and the system determines if the contact was successful. The definition of success may be that a call was placed and the customer answered the telephone and spoke with an agent. If an outbound email is sent, success may simply mean that the message was sent and received (read) by the customer. If the contact was determined to be successful at step 308, then at step 310 the system logs the results. The failed or incomplete interaction history of the customer subject to the outbound contact may be purged from the interaction history log. If at step 309 the contact was not successful, for example the customer did not answer the telephone, the contact may be rescheduled.

In one embodiment of the present invention an outbound contact attempt, such as a telephone contact, may be made by an automated outbound contact server, where for customers that had an incomplete or failed session, the original goal of those customers is treated according to the state the customer last left the system. For example, if the customer was at a particular place in a voice application process then the system could re-connect the customer to the appropriate place in the process, retaining all of the information of the failed session. A prompt may be played to such a customer, such as "We noticed that you were unable to complete the application" "May we help you with that task now?" or "It looks like you were disconnected while waiting for an agent to discuss an issue with your most recent bill, would you like me to find an agent for you now?".

The system may determine whether a particular customer should receive live assistance or not depending on the nature of the incomplete session and whether a proper solution calls for a live agent. Any time in the process the system may determine live assistance is required and may prompt the customer to ask if she will accept live assistance.

In one embodiment of the invention an incoming call attempt may be logged where the customer left the queue before a live agent could take the call, and where the same customer has a session in progress, such as a Web session in which the customer is having difficulties, which precipitated the live call attempt. In such a situation, it may be important to the center to take immediate action while the Web session is still in progress. There is no time limit to detect a failed transaction or an incomplete or fragmented session. If the Web session is being monitored by the iCFD CIVA application then it may detect a problem (fragmented session) before the customer attempted to call the center. In this case the system could send a popup message offering live assistance (escalation). If the Web sessions are not monitored for difficulties in real time, but dropped incoming calls are, then the CIVA application may detect that the customer who just dropped from queue has a Web session in progress. Some CRM data lookup might be required to correlate the customer information such as by looking up the customer's telephone number and checking for an IP address and other identifying signatures. A system check of all of the current interactions in progress by signature ID may then be performed and the Web session may then be discovered in progress.

Figure 4:
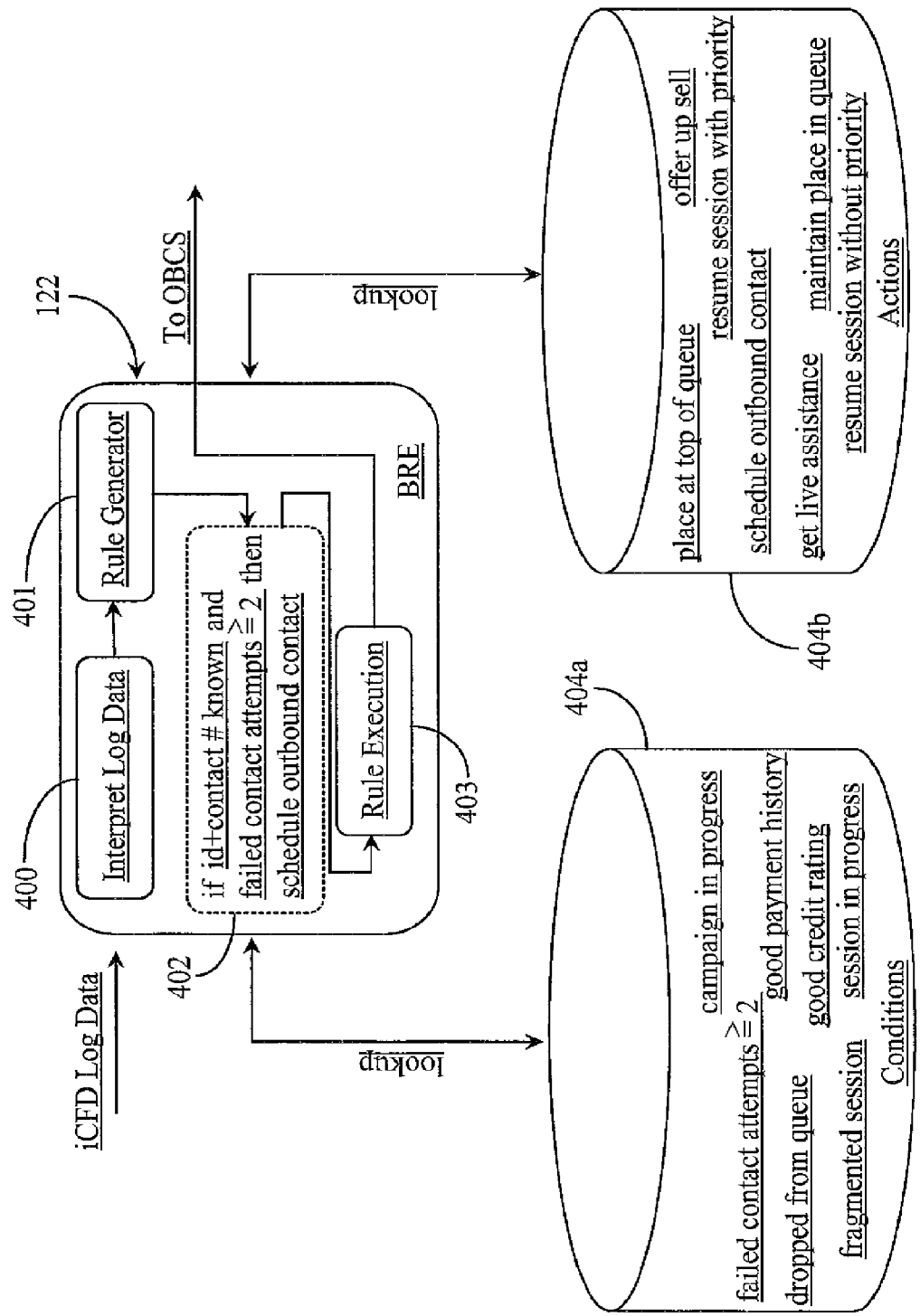
FIG. 4 is a block diagram illustrating dynamic business rule generation and execution for realizing customer retention according to an embodiment of the present invention.

FIG. 4 is a block diagram illustrating rule construction and execution according to one embodiment of the invention. In one embodiment rules governing the process of detecting incomplete or failed sessions and taking action accordingly are dynamically assembled from constructs representing conditions that may be found true or false and constructs representing actions that may be executed. A rule may be dynamically built and then executed in one embodiment. In another embodiment complete rules may be provided that are static and executable if the entire rule proves true.

Business Rules Engine (BRE) 122 is illustrated logically in this example and has connection to a data repository 404a containing possible conditions that might warrant some action on the part of the contact center. Some possible conditions might be that a call is dropped from queue or that there were two or more failed attempts to contact the center.

One condition might be that a Web session was fragmented, meaning that the customer did not successfully complete the session. Another condition might be relevant to current contact center state, such as an outbound campaign is in progress. Conditions might be discovered about a customer such as the customer has a session currently in progress. Other routing conditions may be incorporated into a rule such as EWT for a queue, agent availability and others. Routing conditions may be accessed from routing strategy to complete a rule. Other conditions may be provided that may be relevant to customer status within the contact center, such as a customer has a good payment history or a good credit rating. Social status, geo-demographics, Web analytics, and other customer-related information can play a part in a decision of what available course to pursue in the wake of detection of customer initiated incomplete sessions or failed transactions.

BRE 122 has access to a logical repository 404b containing predefined actions that may be equated to one or more conditions found to be true about a customer interaction and the customer in general. Some possible actions might include placing the customer at the top or front of queue, maintaining the customer's last place in queue, or scheduling a live outbound contact. Other actions may include resuming a customer session with or without priority, get live assistance, or offer an up sell.

In one embodiment BRE 122 receives input in the form of iCFD log data that contains incomplete interaction history data detected by a monitoring application like a customer verification application or some other interaction monitor. In this example the data that is fed into BRE 122 is data that was determined to be at least questionable in the complete interaction history such as fragmented sessions, failed transactions, unanswered email messages, dropped calls from queue and the like.

In one embodiment BRE 122 is central to the decision process such that it may interpret data fed to it using a parser or data interpreter 400 for interpreting the log data. BRE 122 may identify any predefined conditions that may exist in the received log data. The true conditions may be passed to a rule generator 401. Based on the true conditions for an incomplete session, the rule generator may select an appropriate predefined action that may equate to the found conditions. An exemplary rule 402 might be a conditional rule generated as a result of discover of conditions such as if the ID and contact # of the customer is known and failed contact attempts are equal to or greater than the value of 2, then schedule an outbound contact. In this case a pattern of incomplete or failed session data is required before action can be taken. The pattern is that the same customer called two or more times without getting service.

Once a rule is created or assembled for a customer it may be executed by the system (rule execution) 403 to carry out whatever action is required. In this case the action is sent in the form of a request to an outbound contact server (OBCS). Data included in the request includes at least the customer ID and telephone number and the original customer goal if known. The data may include the dates and times of the failed call attempts which may give the system intelligence concerning a good time to attempt the outbound contact. Additional information may also play a part in determining the routing strategy used to place the outbound call such as consideration of a value ranking the customer importance to the center based on net worth, payment history, product loyalty, referrals made, etc.

An additional action such as place at top of queue may be added based on customer importance weighting. The iCFD application may greet the customer when the customer picks up the call and may play a special prompt letting the customer know that the call attempt did not go unnoticed and apologizing for any inconvenience. A next prompt may verify the customer and determine if the customer still has the same goal detected in the incomplete or failed sessions. The iCFD application may then ask if the center may help by providing live assistance now or resuming the previous session. In one embodiment some outbound calls may be placed manually by live agents if the customer is very important to the center or through some fault of the center the customer was inconvenienced in some way. The exact role and configuration of a business rules engine may vary according to desired implementation. In one embodiment the rules engine is a centerpiece system interfacing directly or through middleware with customer contact and interfacing systems and data server systems in the center. In another embodiment the rules engine is dedicated for deciding what if any action is prescribed for incomplete or failed sessions including sessions in progress where the customer is having difficulties.

Figure 5:
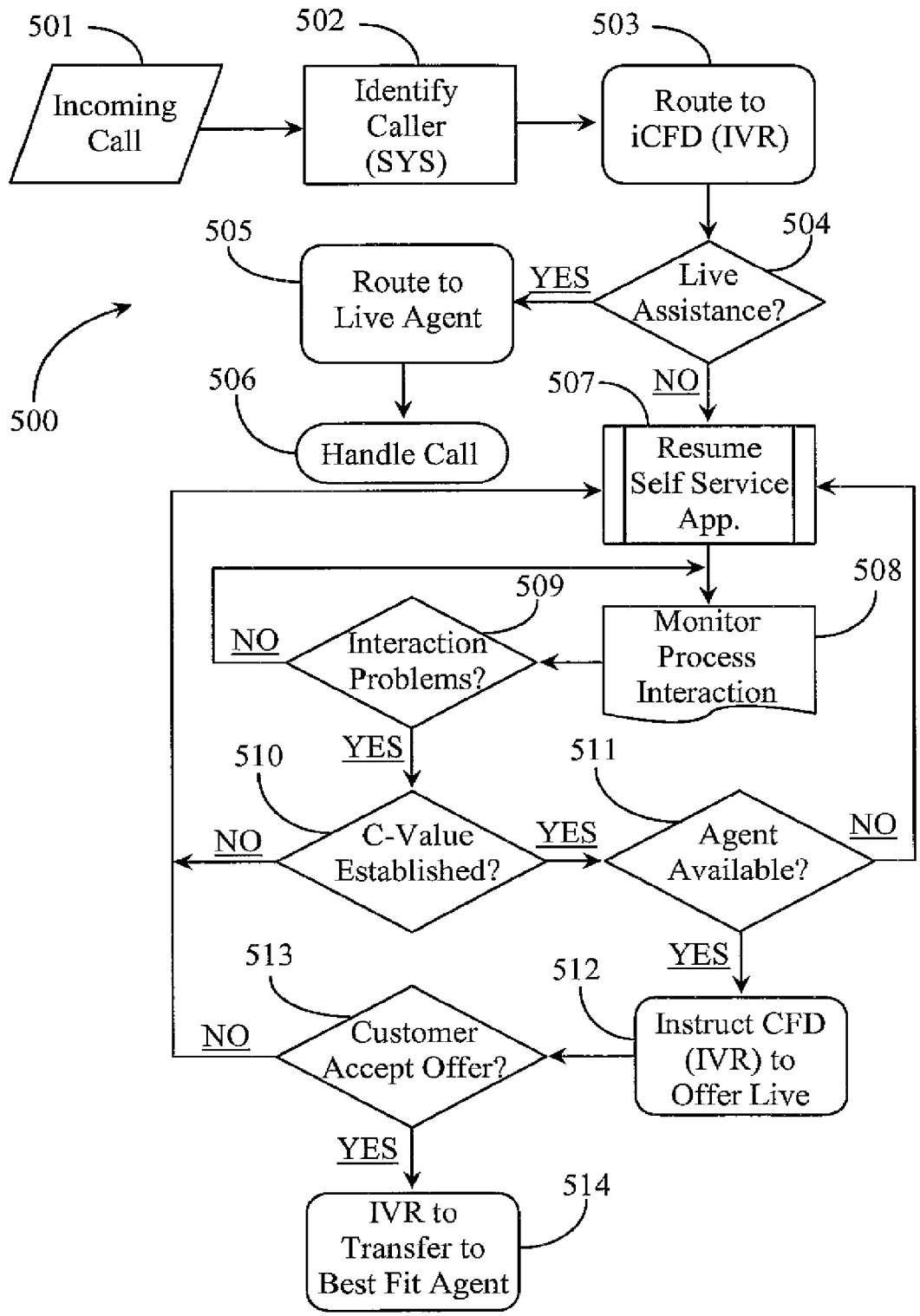
FIG. 5 is a process flow chart illustrating steps for providing live assistance after detecting a failed interaction pattern.

FIG. 5 is a process flow chart 500 illustrating steps for offering live assistance to a customer according to an embodiment of the present invention. At step 501 an incoming call arrives at the call center switch. At step 502 the caller is identified by the system through ANI and telephone number lookup. At step 503 the caller may be routed to iCFD (IVR) for initial treatment. At step 504 while the caller is interacting with the iCFD application, the system may determine if live assistance is required to satisfy the goal of the caller. If the system determines that live assistance is required based on the customer's goal, then at step 505 the call is routed to a live agent. At step 506 the call is handled by an available agent.

If at step 504 the system determines that self-help (voice application) is sufficient to satisfy the goal of the caller then at step 507 self service treatment is resumed according to the goal off the caller. At step 508 a monitoring application monitors the interaction process between the caller and the system. At step 509 the monitoring system determines if there are any difficulties or problems with the interaction. For example, a problem might be difficulty entering a credit card number according to IVR instruction. Another problem might be entering a wrong pass code or personal identification number (PIN). If no interaction problems are detected in step 509 the process continues monitoring the interaction at step 508.

If at step 509 interaction problems are identified, then at step 510 the information is logged, and optionally, the system attempts to determine the value of the customer to the call center. In this case a value ranking for the customer can help to determine whether an intervention is warranted. In one embodiment intervention is the course regardless of customer value ranking if problems are detected in the interactive process. For example, if the interaction problem is difficulty entering credit card information during a transaction, then intervention may be warranted if only to salvage the transaction. However, if the interaction difficulty does not involve a transaction and the customer value is low then the system may decide to resume the interactive process with no intervention.

If the system determines that the customer has a high value ranking or is important to the contact center, then the system may check agent availability at step 511. If at step 511 an agent is not available to help the customer with the interactive process, then the process may loop back to the interactive process with continued monitoring (steps 507 and 508). In one embodiment where there is no live assistance available and/or if estimated waiting time is queue is high, then some other form of automated assistance might be offered instead of live service depending on the nature of the interaction. For example, if the customer is attempting a transaction and his having difficulty entering a credit card number correctly, the iCFD application might be instructed to offer a telephone check transaction instead of taking a credit card number.

If at step 511 the system determines an agent is available to assist the customer, then at step 512 the system may instruct the CFD application to ask the customer if she would accept live assistance. At step 513 the customer makes a decision whether to accept or reject the live assistance offer by saying yes or no to the prompt. If the customer declines live assistance, the process may move back to step 507 for continued interaction and monitoring. In one embodiment a prompt might follow the declination of live assistance to ask the customer if she wishes to be called back at a later time to resume the process with live assistance.

If at step 513 the customer accepts the offer, the IVR may transfer the customer at step 514 to a live agent according to internal best-fit routing strategy. The available agent may then help the customer finish the process and can terminate the call or send the customer back to the application for a next process if warranted. In the event that the customer declines live assistance at step 513 and continues to have difficulty navigating the process, the difficulties may be recorded as an incomplete session or failed transaction, and the process of determining if an outbound contact will be initiated such as described in the process of FIG. 3 may be launched on behalf of the customer. An offer made to the customer to accept live assistance may include an option for being transferred immediately to a live agent, being called back by a live agent, being routed to a chat session with a live agent while the IVR session remains in progress, or similar options.

One with skill in the art off interactive session management will appreciate that the present invention may also be used to escalate an interaction which is not currently moving forward in a timely manner. For example, a potential customer may send an email message to the contact center with questions about a service or product. The message routing system may deliver the email to the appropriate inbox, but due to a large email backlog too much time passes before the email is responded to by an agent.

Later, the customer calls the center frustrated by the lack of an email response and to ask some additional questions not posed in the email. When the customer is identified the system may detect that there is an open email from the customer that has not been replied to. The session may be defined as an unresolved session in progress. Because of the unresolved email issue, the system may determine to route the customer call to an available agent to handle both the email questions and any other questions the customer has. The session data including the email is forwarded to the agent before the agent takes the call. When the agent answers the call he may acknowledge the slow email response, apologize for the lack of service and ask the customer if he could help answer the questions posed in the email message and any other questions the customer might have.

In a similar scenario the customer might be navigating a process on the company Web site and, having difficulty with the process, decides to call the center to ask for live assistance to finish the Web-related process. The Web session is shown as a session in progress with some pattern of difficulty identified. The customer is identified by the CIVA through the iCFD application, and after correlating the customer's telephone number to the IP address of the customer's computing device, finds the session in progress. The iCFD decides to route the call to an available agent to help the customer with the Web process. Before the agent takes the call, the system forwards the session in progress data to the agent, including popping the Web page the customer is interacting with onto the agent computer screen. The agent can then pick up the call and can help the customer with the Web-related process. The Web page the customer is navigating can be popped on to the monitor used by the agent for reference and the agent can verbally explain the process the customer is having difficulty with over the telephone.

In one embodiment the system of the invention is integrated with each communications system used by the contact center including but limited to telephony including connection oriented switched telephony (COST) and data network telephony (DNT), chat services, messaging, and other Web-based interactions.

The invention has been described above by embodiments and examples, which are representative of the invention, but not limiting. The invention is limited only by the claims below.

What is claimed is:

1. A system for managing customer involvement with a contact center, the system comprising:
    a switch configured to receive a plurality of communications for routing to one or more contact center resources;
    a processor coupled to the switch; and
    a memory coupled to the processor, wherein the memory has stored thereon instructions that, when executed by the processor, cause the processor to:
    establish a current communication session with an end user device;
    identify a user engaged in the current communication session;
    determine, during the current communication session, whether data for a terminated interaction conducted prior to the current communication session exists for the user in a database, wherein the terminated interaction includes an automated interaction process comprising a plurality of predetermined stages arranged in a predetermined sequential order, wherein the automated interaction process was terminated after completing a first stage from among the plurality of predetermined stages arranged in the predetermined sequential order;
    retrieve the data for the terminated interaction from the database, wherein the retrieved data includes information on which of the plurality of stages of the automated interaction process during the terminated interaction were completed;
    determine, from the retrieved data, a commercial goal of the user that went unsatisfied;
    transmit a signal to the switch for routing the current communication session to a contact center communication device based on the retrieved data for the terminated interaction;
    resume the current communication session at a second stage from among the plurality of stages that is arranged after the first stage in the predetermined sequential order based on the retrieved data; and initiate an activity directed to the process based on the commercial goal.

2. The system of claim 1, wherein the data for the terminated interaction indicates at least one of a failed connection attempt, failed transaction attempt, unanswered message, or uncompleted process.

3. The system of claim 1, wherein the data for the terminated interaction indicates an uncompleted process.

4. The system of claim 3, wherein the uncompleted process is an uncompleted interaction with an interactive voice response system.

5. The system of claim 3, wherein the uncompleted process is an uncompleted Web session.

6. The system of claim 5, wherein the activity includes invoking an agent during the current communication session for aiding the user in the uncompleted Web session.

7. The system of claim 6, wherein the current communication session is a telephone session, chat session, or messaging session.

8. The system of claim 7, wherein the uncompleted Web session runs concurrently with the current communication session.

9. The system of claim 1, wherein the current communication session and the terminated interaction are associated with different types of communication media.

10. The system of claim 1, wherein the instructions that cause the processor to initiate an activity directed to the process include instructions that cause the processor to prompt resumption of the process from a point in which the process was discontinued.

11. The system of claim 1, wherein the instructions that cause the processor to initiate an activity includes instructions that cause the processor to prioritize routing of an interaction associated with the current communication session, to an agent.

12. A method for managing customer involvement with a contact center, comprising:
  establishing, by a processor, a current communication session with an end user device;
  identifying, by the processor, a user engaged in the current communication session;
  determining, by the processor, during the current communication session, whether data a terminated interaction conducted prior to the current communication session exists for the user in a database, wherein the terminated interaction includes an automated interaction process comprising a plurality of predetermined stages arranged in a predetermined sequential order, wherein the automated interaction process was terminated after completing a first stage from among the plurality of predetermined stages arranged in the predetermined sequential order;
  retrieving, by the processor, the data for the terminated interaction from the database, wherein the retrieved data includes information on which of the plurality of stages of the automated interaction process during the terminated interaction were completed;
  determining, by the processor, from the retrieved data, a commercial goal of the user that went unsatisfied;
  transmitting, by the processor, a signal to a switch for routing the current communication session to a contact center communication device based on the retrieved data for the terminated interaction;
  resuming, by the processor, the current communication session at a second stage from among the plurality of stages that is arranged after the first stage in the predetermined sequential order based on the retrieved data; and
  initiating, by the processor, an activity directed to the process based on the commercial goal.

13. The method of claim 12, wherein the data for the terminated interaction indicates at least one of a failed connection attempt, failed transaction attempt, unanswered message, or uncompleted process.

14. The method of claim 12, wherein the data for the terminated interaction indicates an uncompleted process.

15. The method of claim 14, wherein the uncompleted process is an uncompleted interaction with an interactive voice response system.

16. The method of claim 14, wherein the uncompleted process is an uncompleted Web session.

17. The method of claim 16, wherein the activity includes invoking an agent during the current communication session for aiding the user in the uncompleted Web session.

18. The method of claim 17, wherein the current communication session is a telephone session, chat session, or messaging session.

19. The method of claim 12, wherein the current communication session and the terminated interaction are associated with different types of communication media.

20. The method of claim 12 wherein the activity includes prompting resumption of the process from a point in which the process was discontinued.

21. The method of claim 12, wherein the activity includes prioritizing routing of an interaction associated with the current communication session, to an agent.

* * * * *